United States Patent [19]
Ishigaki et al.

[11] Patent Number: 6,095,180
[45] Date of Patent: Aug. 1, 2000

[54] HIGH-VACUUM VALVE

[75] Inventors: Tsuneo Ishigaki; Kenji Waragai, both of Yawara-mura, Japan

[73] Assignee: SMC Corporation, Japan

[21] Appl. No.: 09/299,125

[22] Filed: Apr. 26, 1999

[30] Foreign Application Priority Data

May 20, 1998 [JP] Japan .................................. 10-153675

[51] Int. Cl.[7] ................................................. F16L 53/00
[52] U.S. Cl. ........................................... 137/341; 251/167
[58] Field of Search ............................. 137/311; 251/167

[56] References Cited

U.S. PATENT DOCUMENTS

| | | | |
|---|---|---|---|
| 3,120,944 | 2/1964 | Cogez et al. ............................. | 251/203 |
| 4,718,637 | 1/1988 | Contin ...................................... | 251/158 |
| 5,413,139 | 5/1995 | Kusumoto et al. ...................... | 137/341 |
| 5,485,542 | 1/1996 | Ericson .................................... | 137/341 |
| 5,531,245 | 7/1996 | Sparks ..................................... | 137/341 |
| 5,755,255 | 5/1998 | Iwabuchi ................................. | 137/341 |
| 5,836,568 | 11/1998 | Ishigaki et al. . | |

FOREIGN PATENT DOCUMENTS

9303577   11/1997   Japan .

Primary Examiner—A. Michael Chambers
Assistant Examiner—Thomas L. McShane
Attorney, Agent, or Firm—Baker Botts L.L.P.

[57] ABSTRACT

A high-vacuum valve arranged to prevent conduction of heat from a valve element to a low-temperature part through a valve shaft. After the valve element has been moved to a position facing opposite to a valve seat by rectilinear motion of the valve shaft, the valve element is pressed against the valve seat to close the valve by pivotal motion of the valve shaft. A heater is provided in the valve shaft in close contact with it. Wiring is connected to the heater to supply it with electric power from outside the high-vacuum valve.

6 Claims, 4 Drawing Sheets

HIGH-VACUUM VALVE

BACKGROUND OF THE INVENTION

The present invention relates to a high-vacuum valve that is used to open and close a transfer passage maintained under vacuum and also used to open and close an evacuation passage. To transfer a work such as an integrated circuit (IC) or parts thereof from a vacuum treating chamber to another vacuum treating chamber, for example, a high-vacuum valve is provided in a transfer passage having a rectangular sectional configuration. A high-vacuum valve is also provided in an evacuation passage that connects a high-vacuum treating chamber and a vacuum pump.

There is known a high-vacuum valve for a transfer passage that has a valve body having a valve chamber therein. The valve body has a first opening formed in the front wall thereof and a second opening formed in the rear wall thereof. A valve seat is formed on the inner side of the first or second opening. A valve element (gate or blade) is connected to the proximal end of a valve shaft that performs rectilinear motion. The valve element is pressed against the valve seat to close the valve [for example, see Japanese Patent Application Unexamined Publication (KOKAI) No. 9-303577]. In this high-vacuum valve, the valve shaft extends through a center hole in the top wall of the valve body in a non-contact manner. The side surface of a portion of the valve shaft that is outside the valve chamber is covered with a bellows in a non-contact manner. The area between the distal end of the bellows and the distal end portion of the valve shaft is hermetically sealed. The area between the proximal end of the bellows and a portion of the top wall that surrounds the center hole is hermetically sealed.

In a conventional high-vacuum valve (gate valve) for a transfer passage, after the valve element has been moved to a position facing opposite to the valve seat by the rectilinear motion of the valve shaft, the valve element is pressed against the valve seat by pivotal motion of the valve shaft. In this case, the valve element is pressed against the valve seat by using a complicated mechanism as follows. An engagement portion having a front surface and a rear surface is formed at the distal end of the valve shaft. The front and rear surfaces of the engagement portion are engaged with a first engaging roller and a second engaging roller, respectively, which are rotatably supported by a roller support member. When a fulcrum roller that is connected to the distal end portion of the valve shaft is supported by the proximal end of a fulcrum groove, the roller support member is moved forward to make the first engaging roller engage with a slant portion of the front surface of the engagement portion, thereby causing the valve shaft to pivot in a direction in which the valve element is pressed against the valve seat.

In a conventional high-vacuum valve for an evacuation passage [referred to as "L-type valve"; for example, see Japanese Patent Application Unexamined Publication (KOKAI) No. 10-2452], a reaction product from a reaction gas is deposited on the inside of the high-vacuum valve when the temperature is below a predetermined level, making it difficult to control the high-vacuum valve. To solve this problem, it is required that the upper part of the valve body, the valve-side flange of the valve body, the bellows-side flange of the valve body, the outside of the valve part and so forth should be placed at a uniform temperature. Therefore, to maintain the temperature of the high-vacuum valve for an evacuation passage above a predetermined level, a heater is installed outside the valve body, and materials of high thermal conductivity are used for the valve body, the bonnet, the valve element and the bellows, thereby transferring heat to the inside of the valve body mainly by heat conduction and radiation.

SUMMARY OF THE INVENTION

The problem of the deposition of a reaction product from a reaction gas arises not only in the high-vacuum valve for an evacuation passage but also in the high-vacuum valve for a transfer passage. To prevent the deposition of a reaction product in the high-vacuum valve for a transfer passage, the conventional practice is to heat the outside of the valve chamber with a heater. By the heating applied from the outside of the valve body, in the high-vacuum valve (gate valve) for a transfer passage, the valve element and the valve shaft are subjected to radiation heat from the surroundings; in the high-vacuum valve (L-type valve) for an evacuation passage, the valve element and the bellows are subjected to the radiation heat. However, both the high-vacuum valves have a valve element driving unit (actuator) for operating the valve element, and this valve element driving unit is placed under low-temperature conditions. Therefore, the heat transferred to the valve element escapes toward the valve element driving unit, which is at a low temperature, through the valve shaft. If the valve element is further heated with heaters that are provided outside and inside the valve body, a problem arises with regard to the insulation of the lead wires of the heaters at high temperatures.

A first object of the present invention is to prevent conduction of heat from the valve element to a low-temperature part through the valve shaft.

A second object of the present invention is to simplify a mechanism for pressing the valve element against the valve seat by pivotal motion of the valve shaft in the high-vacuum valve for a transfer passage.

The present invention is applied to a high-vacuum valve including a valve body that has a valve chamber therein. The valve body has a first opening formed in the front wall thereof and a second opening formed in the rear wall thereof. A valve seat is formed on the inner side of the first opening or the second opening. A valve element is connected to the proximal end of a valve shaft that performs rectilinear motion. The valve shaft extends through a center hole in the top wall of the valve body in a non-contact manner. The side surface of a portion of the valve shaft that is outside the valve chamber is covered with a bellows in a non-contact manner. The area between the distal end of the bellows and the distal end portion of the valve shaft is hermetically sealed. The area between the proximal end of the bellows and a portion of the top wall that surrounds the center hole is hermetically sealed. After the valve element has been moved to a position facing opposite to the valve seat by rectilinear motion of the valve shaft, the valve element is pressed against the valve seat to close the valve (formed from the valve element and the valve seat) by pivotal motion of the valve shaft. According to a first arrangement of the present invention, a heater is provided in the valve shaft in close contact with it, and wiring is connected to the heater to supply it with electric power from outside the high-vacuum valve.

In addition, the present invention is applied to a high-vacuum valve including a valve body that has a valve chamber therein. A plurality of ports are communicated with the valve chamber through respective tubular portions. A bonnet is connected to the top of the valve body. A valve seat is formed in a flow path connecting the valve chamber and one of the tubular portions. The flow path is closed by bringing a valve element into contact with the valve seat, and the flow path is opened by separating the valve element from the valve seat. A valve shaft is secured to the valve element. The valve shaft extends through a center hole in the bonnet. According to a second arrangement of the present invention, a heater is provided in the valve shaft in close contact with it, and wiring is connected to the heater to supply it with electric power from outside the high-vacuum valve.

In addition, the present invention is applied to a high-vacuum valve including a valve body that has a valve chamber therein. The valve body has a first opening formed in the front wall thereof and a second opening formed in the rear wall thereof. A valve seat is formed on the inner side of the first opening or the second opening. A valve element is connected to the proximal end of a valve shaft that performs rectilinear motion. The valve shaft extends through a center hole in the top wall of the valve body in a non-contact manner. The side surface of a portion of the valve shaft that is outside the valve chamber is covered with a bellows in a non-contact manner. The area between the distal end of the bellows and the distal end portion of the valve shaft is hermetically sealed. The area between the proximal end of the bellows and a portion of the top wall that surrounds the center hole is hermetically sealed. After the valve element has been moved to a position facing opposite to the valve seat by rectilinear motion of the valve shaft, the valve element is pressed against the valve seat to close the valve by pivotal motion of the valve shaft. According to a third arrangement of the present invention, a cap body is connected to an upper portion of the valve shaft. A fulcrum roller is connected to a lower portion of the cap body. The fulcrum roller is engaged with a fulcrum groove. A guide roller is connected to an upper portion of the cap body. The guide roller is engaged with a cam groove of a transmission member. When the fulcrum roller lies at the proximal end of the fulcrum groove, the transmission member moves downward, causing the guide roller to move along the cam groove, thereby actuating the valve shaft to pivot in a direction in which the valve element is pressed against the valve seat.

According to a fourth arrangement of the present invention, a cap body is connected to an upper portion of the valve shaft in the first arrangement. A fulcrum roller is connected to a lower portion of the cap body. The fulcrum roller is engaged with a fulcrum groove. A guide roller is connected to an upper portion of the cap body. The guide roller is engaged with a cam groove of a transmission member. When the fulcrum roller lies at the proximal end of the fulcrum groove, the transmission member moves downward, causing the guide roller to move along the cam groove, thereby actuating the valve shaft to pivot in a direction in which the valve element is pressed against the valve seat.

According to a fifth arrangement of the present invention, the transmission member in the third or fourth arrangement is connected to an output shaft of an actuator. The transmission member and the cap body are connected by a guide rod so as not to come away from each other in excess of a set distance. A spring is fitted between the transmission member and the cap body to urge them to come away from each other.

According to a sixth arrangement of the present invention, at least one heater is provided in the valve body in the first or fifth arrangement.

In the high-vacuum valves according to the first, second, fourth, fifth and sixth arrangements, a heater is provided in the valve shaft in close contact with it, and wiring is connected to the heater to supply it with electric power from outside the high-vacuum valve. Accordingly, it is possible to prevent conduction of heat from the valve element to a low-temperature part through the valve shaft. In addition, heat can be conducted to the valve element from the valve shaft to further raise the temperature of the valve element. In particular, the high-vacuum valve according to the sixth arrangement has at least one heater provided in the valve body. Therefore, the valve element is heated by the heater in the valve body, and the temperature of the valve shaft is maintained at the same temperature as that of the valve element by the heater in the valve shaft. Thus, conduction of heat from the valve element to a low-temperature part through the valve shaft can be completely prevented.

In the high-vacuum valve according to the third arrangement, a cap body is connected to an upper portion of the valve shaft. A fulcrum roller that is connected to a lower portion of the cap body is engaged with a fulcrum groove. A guide roller that is connected to an upper portion of the cap body is engaged with a cam groove of a transmission member. When the fulcrum roller lies at the proximal end of the fulcrum groove, the transmission member moves downward, causing the guide roller to move along the cam groove, thereby actuating the valve shaft to pivot in a direction in which the valve element is pressed against the valve seat. Thus, the high-vacuum valve for a transfer passage has a simplified mechanism for pressing the valve element against the valve seat by pivotal motion of the valve shaft.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENT

FIGS. 1A to 3C show an embodiment of the high-vacuum valve for a transfer passage according to the present invention. In the following description of the embodiment, expressions relating to directions are based on the directions as viewed in the drawings except that the left as viewed in FIG. 1B or 3A is referred to as "front", and the right as "rear". In addition, expressions used in the claims are put in parentheses as the occasion demands.

The high-vacuum valve has a valve body 11 at the lower side thereof and a valve element driving unit 12 at the upper side thereof. The valve body 11 is a rectangular parallelepiped. The valve body 11 has a front wall 22 (left wall in FIG. 3A) and a rear wall 23 (right wall in FIG. 3A). The front wall 22 is provided with a first opening 14 having an approximately rectangular cross-sectional configuration. Similarly, the rear wall 23 is provided with a second opening 15 having an approximately rectangular cross-sectional configuration. In the valve body 11, a valve chamber 16 is formed by a bottom wall 21, side walls 25A and 25B, the front wall 22, the rear wall 23, and a top wall (bonnet) 26. The above-described walls are each secured by an appropriate method, and thus the valve chamber 16 is closed.

In the valve chamber 16, a plate-shaped valve element (gate valve) 18 is connected to the lower end (proximal end) of a columnar valve shaft 19 through a sub-plate 17. The valve element 18 and the valve shaft 19 are inserted into the valve chamber 16 in such a manner as to be capable of both rectilinear motion and pivotal motion. The valve element 18 is secured to the lower end (proximal end) of the valve shaft 19 by using a bolt 56 and so forth. The valve element 18 has a U-groove near the outer periphery of a rectangular front surface thereof. The U-groove is fitted with a seal member 20. A valve seat 24 is formed by a portion of the inner side of the front wall 22 that surrounds the first opening 14. When the seal member 20 is pressed against the valve seat 24, communication between the first opening 14 and the second opening 15 is cut off. When the seal member 20 separates from the valve seat 24, the first opening 14 and the second opening 15 are communicated with each other. The valve element 18 and the valve seat 24 form a valve 31.

The valve element driving unit 12 is connected to the upper side of the top wall 26. More specifically, the lower end (proximal end) of a cylinder tube 63 of an actuator 61 is connected to the left-hand side of the top wall 26. The lower end (proximal end) of a cylinder tube 64 of an actuator 62 is connected to the right-hand side of the top wall 26. A piston 65 is slidably fitted in the cylinder tube 63. Similarly, a piston 66 is slidably fitted in the cylinder tube 64. A piston rod 67 is connected to the piston 65 and extends through a center hole in a rod cover 69. Similarly, a piston rod 68 is connected to the piston 66 and extends through a center hole in a rod cover 70. The piston 65 is provided with an upper lock groove 59A and a lower lock groove 60A. The piston 66 is provided with an upper lock groove 59B and a lower lock groove 60B. The cylinder tube 63 has an upper end lock mechanism 73A at the upper end thereof and a lower end lock mechanism 74A at the lower end thereof. The cylinder tube 64 has an upper end lock mechanism 73B at the upper end thereof and a lower end lock mechanism 74B at the lower end thereof. When the piston 65 reaches a lower extremity position, the lower lock groove 60A is engaged with a lock piston 86A of the lower end lock mechanism 74A to lock the piston 65. Similarly, when the piston 66 reaches a lower extremity position, the lower lock groove 60B is engaged with a lock piston 86B of the lower end lock mechanism 74B to lock the piston 66. When the piston 65 reaches an upper extremity position, the upper lock groove 59A is engaged with a lock piston 85A of the upper end lock mechanism 73A to lock the piston 65. Similarly, when the piston 66 reaches an upper extremity position, the upper lock groove 59B is engaged with a lock piston 85B of the upper end lock mechanism 73B to lock the piston 66. A transmission member 32 has a plate part 32A at the upper end thereof. The plate part 32A has stepped holes 32B in both end portions thereof. The stepped holes 32B have upper large-diameter portions and lower small-diameter portions. The large-diameter portions of the stepped holes 32B are fitted with the respective upper ends of the piston rods 67 and 68 (i.e. the output members of the actuators 61 and 62). Bolts 33 are passed through the small-diameter portions of the stepped holes 32B and screwed into respective tapped holes provided in the upper end portions of the piston rods 67 and 68. Thus, the upper ends of the piston rods 67 and 68 are connected to the transmission member 32. A cover 30 is bent in a gate-like shape. The lower end of the left side of the cover 30 is secured to the upper end of the left side of the cylinder tube 63. The lower end of the right side of the cover 30 is secured to the upper end of the right side of the cylinder tube 64. Thus, the cover 30 protects the valve element driving unit 12.

The top wall 26 has a stepped center hole 27 in the central portion thereof. A collar guide ring 35 is fitted into the center hole 27 from above. The collar guide ring 35 is secured to the top wall 26 by using bolts. The area between the collar guide ring 35 and the top wall 26 is hermetically sealed with an O-ring. The upper portion of the inner peripheral surface of the center hole 27 is covered with the collar guide ring 35. The valve shaft 19 extends through the collar guide ring 35 and the stepped center hole 27 in such a manner as to maintain a non-contact state. The valve shaft 19 has a small-diameter portion at the upper end (distal end) thereof. An annular ring 36 is fitted on the small-diameter portion of the valve shaft 19. The area between the annular ring 36 and the small-diameter portion of the valve shaft 19 is hermetically sealed with an O-ring. The upper end (distal end) of a metallic bellows 37 is welded to an annular flat surface on the lower side of the annular ring 36 in an airtight manner. The lower end (proximal end) of the bellows 37 is welded to the surface of the collar guide ring 35 in an airtight manner. The upper end portion of the valve shaft 19 extends through the bellows 37 in such a manner as to maintain a non-contact state. The area between the upper end portion of the valve shaft 19 and the collar guide ring 35 is hermetically sealed by the bellows 37 and the annular ring 36. The space between the inner side of the bellows 37 and the outer side of the valve shaft 19 is communicated with the valve chamber 16. However, the valve chamber 16 does not communicate with the atmosphere through the gap between the valve shaft 19 and the guide ring 35. The valve chamber 16, exclusive of the first opening 14 and the second opening 15, is hermetically sealed. The valve chamber 16 is communicated with the outside only through the first opening 14 and the second opening 15.

Figure 1A:
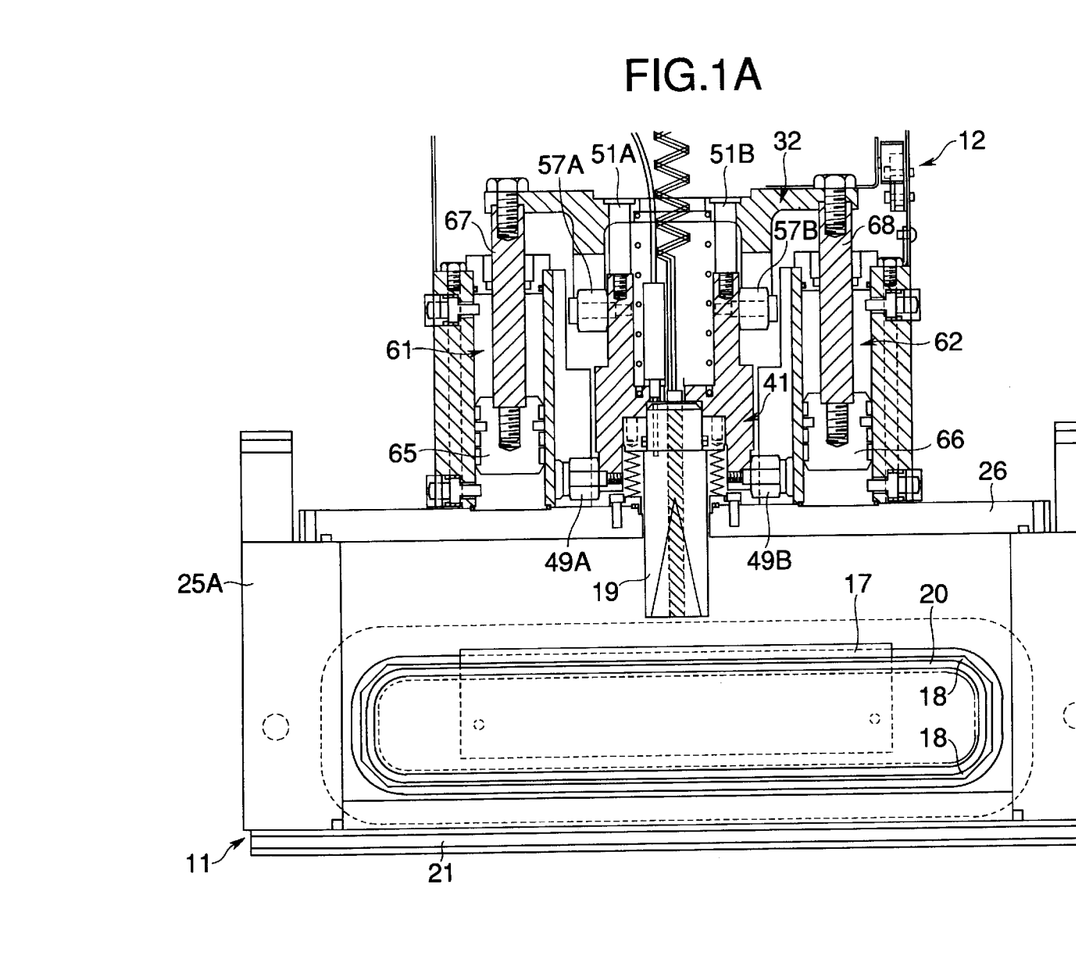
FIG. 1A is a partly-sectioned rear view of a high-vacuum valve according to the present invention.
Figure 1B:
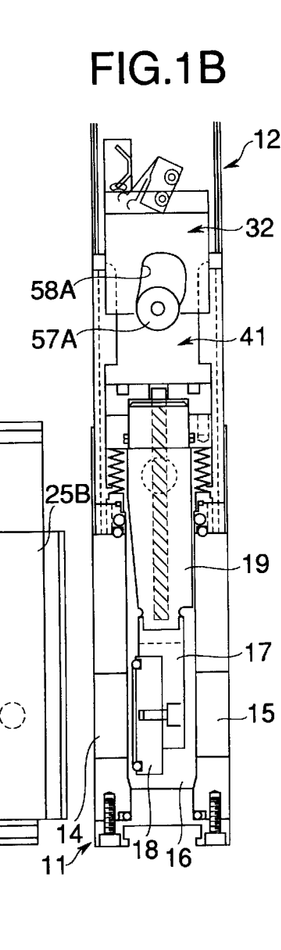
FIG. 1B is a partly-sectioned side view of the high-vacuum valve as viewed from the left-hand side of FIG. 1A.
Figure 2:
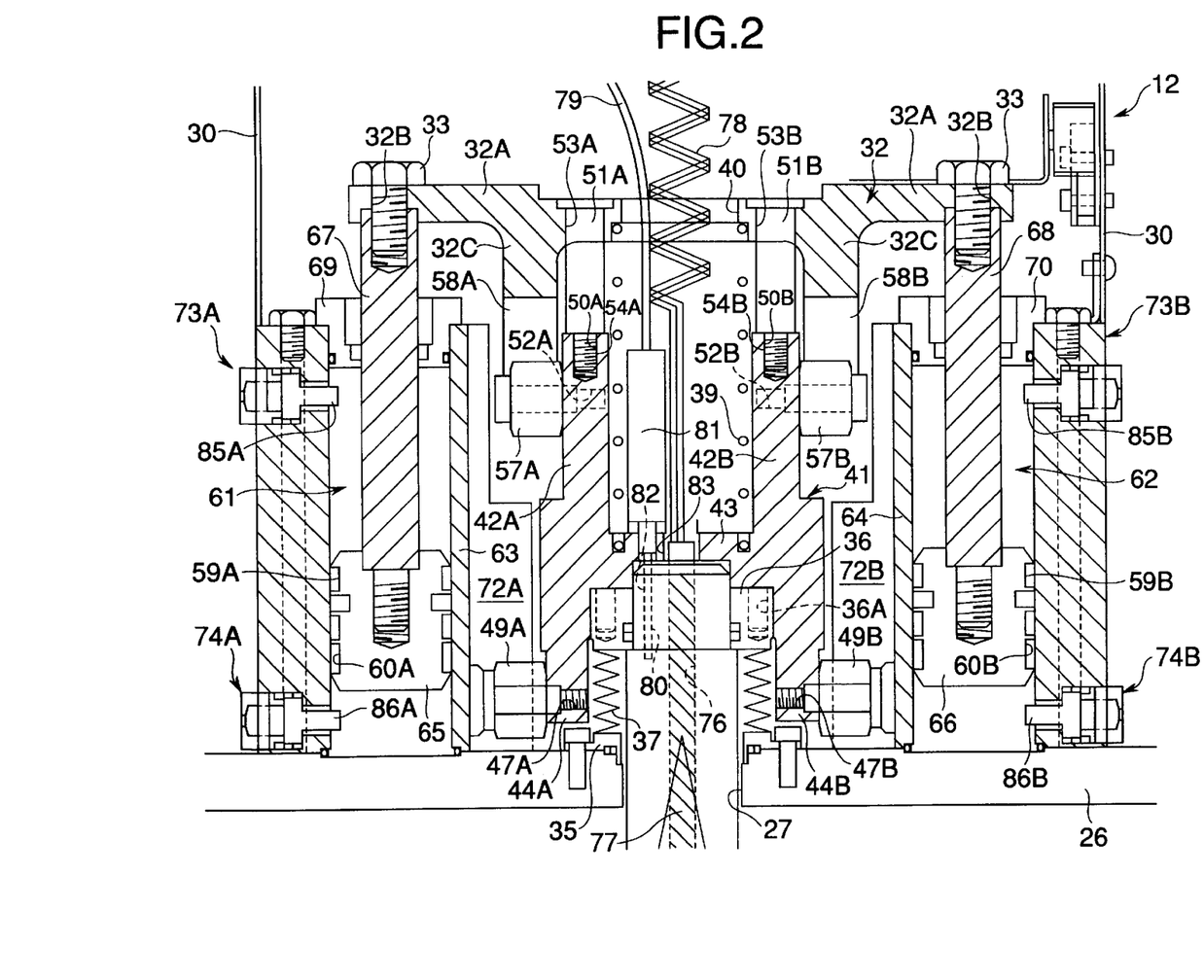
FIG. 2 is an enlarged view of a valve element driving unit shown in FIG. 1A.

A cap body 41 is secured to the upper end of the valve shaft 19. The cap body 41 has an approximately H-shaped vertical sectional configuration and is approximately rectangular as viewed from above. The cap body 41 has two parallel plate-shaped connecting portions 42A and 42B projecting upward. The cap body 41 further has an intermediate portion 43 including a small-diameter bore, an intermediate-diameter bore and a large-diameter bore. In addition, the cap body 41 has two parallel plate-shaped support portions 44A and 44B projecting downward. These portions 42A, 42B, 43, 44A and 44B are integrally formed as one unit. The annular ring 36 is fitted in the large-diameter bore of the intermediate portion 43 of the cap body 41. Bolts (not shown) are screwed into respective bolt holes 36A of the annular ring 36 through through-holes (not shown) in the intermediate portion 43, thereby connecting the cap body 41 and the annular ring 36 to each other. The support portions 44A and 44B are provided with horizontal tapped holes 47A and 47B, respectively. Fulcrum rollers 49A and 49B have their externally-threaded shaft portions screwed into the tapped holes 47A and 47B, respectively, from outside the support portions 44A and 44B. Thus, the fulcrum rollers 49A and 49B are connected to the support portions 44A and 44B. As shown in FIG. 2, a vertically elongate fulcrum groove 72A is formed on the right side of the cylinder tube 63, and a vertically elongate fulcrum groove 72B is formed on the left side of the cylinder tube 64. The upper ends of the fulcrum grooves 72A and 72B are open. The lower ends (proximal ends) of the fulcrum grooves 72A and 72B form a supporting point. The fulcrum rollers 49A and 49B are rollably guided by the fulcrum grooves 72A and 72B, respectively. Thus, the fulcrum rollers 49A and 49B move vertically along the fulcrum grooves 72A and 72B. The support portions 44A and 44B lie outside the bellows 37. The support portions 44A and 44B and the bellows 37 are maintained in a non-contact state.

The connecting portions 42A and 42B of the cap body 41 are provided with tapped holes 52A and 52B that are open outward. Guide rollers 57A and 57B have their externally threaded shaft portions screwed into the tapped holes 52A and 52B, respectively, from outside the connecting portions 42A and 42B. Thus, the guide rollers 57A and 57B are connected to the connecting portions 42A and 42B. The transmission member 32 has two parallel plate-shaped portions 32C projecting downward. The plate-shaped portions 32C have cam grooves 58A and 58B, the lower ends of which are open. The guide rollers 57A and 57B are in engagement with the cam grooves 58A and 58B at all times. The plate part 32A of the transmission member 32 has a stepped center hole 40 in the central portion thereof. The step portion of the center hole 40 serves as an upper spring retainer for a spring 39. A lower spring retainer for the spring 39 is formed on the upper surface of the intermediate portion 43 of the cap body 41. The lower spring retainer is in the shape of an annular groove. The spring 39 fitted between the upper and lower spring retainers urges the transmission member 32 and the cap body 41 to come away from each other.

Figure 3A:
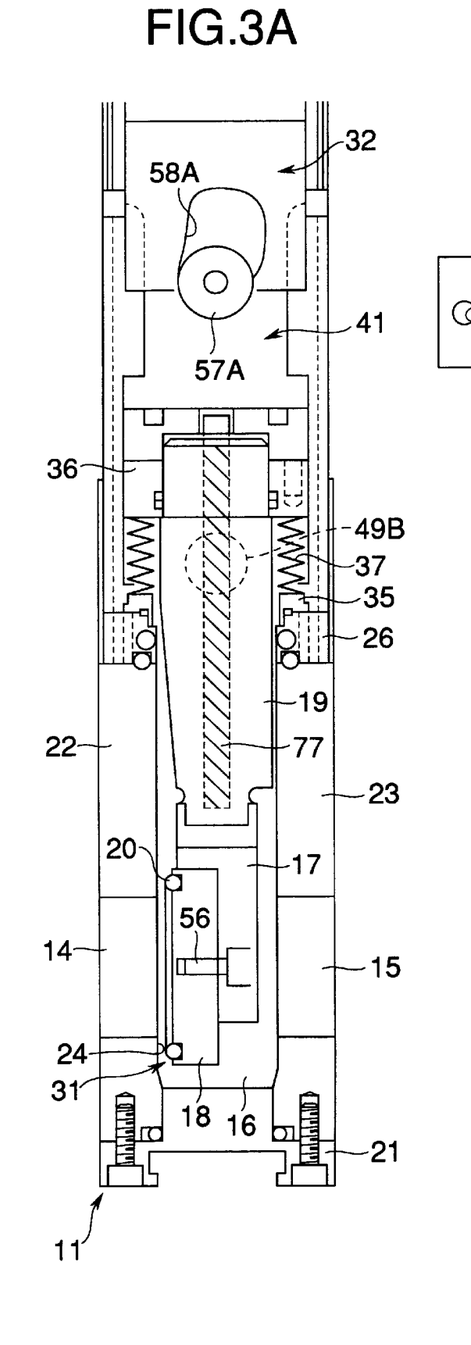
FIG. 3A is an enlarged view of an essential part of the arrangement shown in FIG. 1B.
Figure 3B:
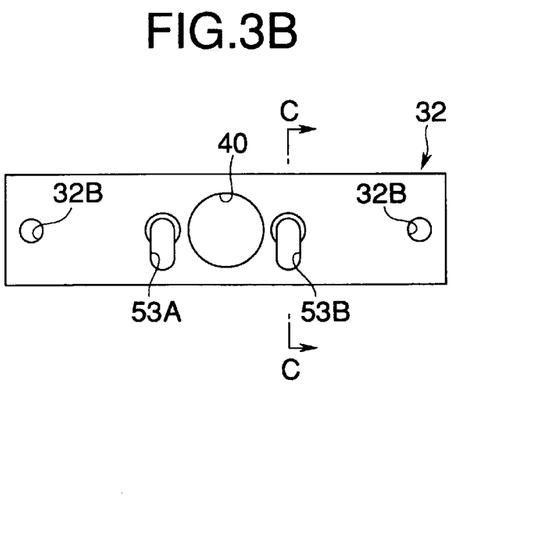
FIG. 3B is an enlarged plan view of a transmission member shown in FIG. 1A.
Figure 3C:
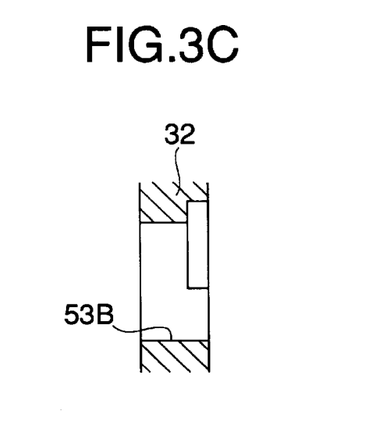
FIG. 3C is a sectional view taken along the line C—C in FIG. 3B.

Stepped guide slots 53A and 53B are formed on the left and right sides, respectively, of the center hole 40 of the transmission member 32 (see FIGS. 3A and 3B). Collar guide rods 51A and 51B are slidably fitted in the guide slots 53A and 53B, respectively. The guide rods 51A and 51B have external threads 54A and 54B formed on their respective lower ends. The external threads 54A and 54B are screwed into respective tapped holes 50A and 50B in the connecting portions 42A and 42B of the cap body 41. Thus, the transmission member 32 and the cap body 41 are connected together so as to be movable relative to each other, and the cap body 41 is prevented from coming away from the transmission member 32 in excess of a set distance. Resilient force from the spring 39 acts in a direction in which the valve shaft 19 comes away from the transmission member 32. Each of the cam grooves 58A and 58B has a small vertical flat surface at the lower end thereof and further has a slant portion that is contiguous with the vertical flat surface. The slant portion slants slightly backward as the distance from its lower end increases upward. When the fulcrum rollers 49A and 49B are off the respective lower ends of the fulcrum grooves 72A and 72B and when they reach the lower ends of the fulcrum grooves 72A and 72B, the guide rollers 57A and 57B are engaged with the vertical flat surfaces at the lower ends of the cam grooves 58A and 58B. At this time, the collars of the guide rods 51A and 51B are fitted into the large-diameter portions at the upper ends of the guide slots 53A and 53B. The guide rods 51A and 51B do not project from the top (surface) of the transmission member 32.

The valve shaft 19 has a shaft hole 76 extending on the center axis from the upper end to the neighborhood of the lower end of the valve shaft 19. The size of the shaft hole 76 is set such that the geometrical moment of inertia of the valve shaft 19 does not reduce. A rod-shaped heater 77 has approximately the same diameter as that of the shaft hole 76. Consequently, the heater 77 is tightly fitted into the shaft hole 76 and thus prevented from slipping out of the shaft hole 76. The upper end portion of the heater 77 projects from the upper end of the valve shaft 19 and is inserted into the small-diameter bore in the intermediate portion 43 of the cap body 41 in a non-contact manner. An extendable cord (wiring) 78, which can extend and contract, is inserted into the high-vacuum valve from the outside. The lower end of the extendable cord 78 is connected to the upper end of the heater 77 to supply electric power to the heater 77. Thus, heat from the heater 77 is conducted to the valve shaft 19.

A fitting hole 80 is formed in the upper end portion of the valve shaft 19 at a position away from the shaft hole 76. The fitting hole 80 has a smaller diameter than that of the shaft hole 76. A through-hole 83 is formed in the intermediate portion 43 of the cap body 41 above the fitting hole 80. A support part of a temperature sensor 81 is fitted into the through-hole 83. A detecting part 82 of the temperature sensor 81 is tightly fitted into the fitting hole 80, thereby making it possible to detect the temperature of the valve shaft 19. The output of the temperature sensor 81 is inputted to a controller (not shown). The controller controls the supply of electric power to the heater 77, thereby enabling the valve shaft 19 to be maintained at a desired temperature. It should be noted that if a predetermined heating thermistor is used in place of the heater 77, a desired temperature can be automatically obtained without using a temperature sensor.

The operation of the embodiment of the high-vacuum valve according to the present invention will be described below. When the valve 31 is fully open, the pistons 65 and 66 lie at the upper stroke ends of the actuators 61 and 62, and the transmission member 32 lies at the upper extremity position. At this time, the lock pistons 85A and 85B of the upper end lock mechanisms 73A and 73B are fitted into the upper lock grooves 59A and 59B of the pistons 65 and 66, respectively. Accordingly, the pistons 65 and 66 are locked at the upper extremity position. As stated above, the transmission member 32 and the cap body 41, together with the valve shaft 19, are connected together so as not to come away from each other in excess of a predetermined distance. Therefore, when the valve 31 is fully open, a predetermined distance is maintained between the transmission member 32 on the one hand and the cap body 41 and the valve shaft 19 on the other. When the predetermined distance is maintained, the guide rollers 57A and 57B are engaged with the vertical surfaces at the lower ends of the cam grooves 58A and 58B, respectively, and the fulcrum rollers 49A and 49B are engaged with the upper portions of the fulcrum grooves 72A and 72B, respectively.

When compressed air is supplied into the rod-side chambers of the actuators 61 and 62 (i.e. the upper chambers with respect to the pistons 65 and 66), the lock pistons 85A and 85B of the upper end lock mechanisms 73A and 73B are withdrawn by the pressure of compressed air. Consequently, the pistons 65 and 66 are unlocked and begin to move downward (forward). At this time, the transmission member 32 and the valve shaft 19 move downward rectilinearly while maintaining the predetermined distance. Consequently, the valve element 18 moves in the direction for closing the high-vacuum valve. As stated above, the left and right ends of the plate part 32A of the transmission member 32 are connected to the upper ends of the piston rods 67 and 68 of the actuators 61 and 62 with the bolts 33, and the fulcrum rollers 49A and 49B, which are connected to the lower end portion of the cap body 41, are engaged with the fulcrum grooves 72A and 72B, respectively. Accordingly, when performing the downward rectilinear motion, the valve shaft 19 does not oscillate in either the longitudinal or lateral direction. Therefore, during the downward rectilinear motion, the outer peripheral surface of the valve shaft 19 does not contact any of the bellows 37, the guide ring 35 and the top wall 26.

When the valve shaft 19 reaches the lower stroke end, the fulcrum rollers 49A and 49B, which are connected to the cap body 41, come in contact with the lower end portions (proximal end portions) of the fulcrum grooves 72A and 72B, and the downward movement of the valve shaft 19 and the cap body 41 stops. Thus, the valve shaft 19, the cap body 41 and the valve element 18 reach the lower extremity position (the lower valve element position shown in FIG. 2). At this time, as shown in the figure, the guide rollers 57A and 57B are engaged with the vertical surfaces at the lower ends of the cam grooves 58A and 58B, respectively.

Even after the valve shaft 19 and the cap body 41 have reached the lower extremity position, the transmission member 32 continues the downward movement. The transmission member 32 moves downward against the resilient force from the spring 39. As the cam grooves 58A and 58B of the transmission member 32 move downward, the guide rollers 57A and 57B gradually move backward along the cam grooves 58A and 58B. This movement causes the valve shaft 19 to pivot about the fulcrum rollers 49A and 49B. Consequently, the lower end of the valve shaft 19 and the valve element 18 gradually move forward. Eventually, the seal member 20 of the valve element 18 is pressed against the valve seat 24 of the front wall 22, and the valve 31 is fully closed. At this time, the lock pistons 86A and 86B of the lower end lock mechanisms 74A and 74B are fitted into the lower lock grooves 60A and 60B of the pistons 65 and 66, respectively, and thus the pistons 65 and 66 are locked at the lower extremity position. When this state is to be maintained for a long period of time, it is possible to suspend the supply of compressed air for operating the actuators 61 and 62. (At the upper extremity position of the pistons 65 and 66, the supply of compressed air can also be suspended.) The guide rods 51A and 51B project upward from the upper end of the transmission member 32. The guide rods 51A and 51B also pivot at the same time as the valve shaft 19 pivots. Therefore, the guide slots 53A and 53B are elongated in the longitudinal direction by machining them elliptically so as not to interfere with the pivotal motion of the guide rods 51A and 51B.

To change the position of the valve 31 from the fully closed position to the lower valve element position, where the valve element 18 faces opposite to the valve seat 24, compressed air is supplied into the head-side chambers of the actuators 61 and 62 (i.e. the lower chambers with respect to the pistons 65 and 66). Consequently, the lock pistons 86A and 86B of the lower end lock mechanisms 74A and 74B are withdrawn by the pressure of compressed air. Thus, the pistons 65 and 66 are unlocked, and the transmission member 32 moves upward (backward) rectilinearly by a predetermined distance. The resilient force of the spring 39 has been set greater than the sum total of the force with which the transmission member 32 is raised through the engagement between the guide rollers 57A and 57B and the cam grooves 58A and 58B and the weight of the valve element 18. Accordingly, when the transmission member 32 is caused to perform upward rectilinear motion, the cap body 41, the valve shaft 19 and the fulcrum rollers 49A and 49B are maintained at the lower extremity position by the resilient force of the spring 39, while the transmission member 32 moves upward with the cam grooves 58A and 58B engaged with the guide rollers 57A and 57B. Eventually, the guide rollers 57A and 57B are engaged with the vertical flat surfaces of the cam grooves 58A and 58B. Thus, the valve 31 reaches a position where the valve element 18 is separate from the valve seat 24 at the lower valve element position.

To change the position of the valve 31 from the position where the valve element 18 is separate from the valve seat 24 at its lower position to the fully open position, the pistons 65 and 66 of the actuators 61 and 62 are caused to further perform upward rectilinear motion. The valve shaft 19 moves upward without oscillating in either the longitudinal or lateral direction as in the case of the downward rectilinear motion of the pistons 65 and 66. During the upward rectilinear motion of the valve shaft 19, the outer peripheral surface of the valve shaft 19 does not contact any of the bellows 37, the guide ring 35 and the center hole 27.

Although the high-vacuum valve has been described above on the premise that it is installed in a vertically erect position as shown in FIGS. 1A to 3C, it should be noted that the high-vacuum valve may be installed in an upside-down position or in a horizontal position. In such a case also, the high-vacuum valve operates in the same way as in the case of the upright position.

Figure 4A:
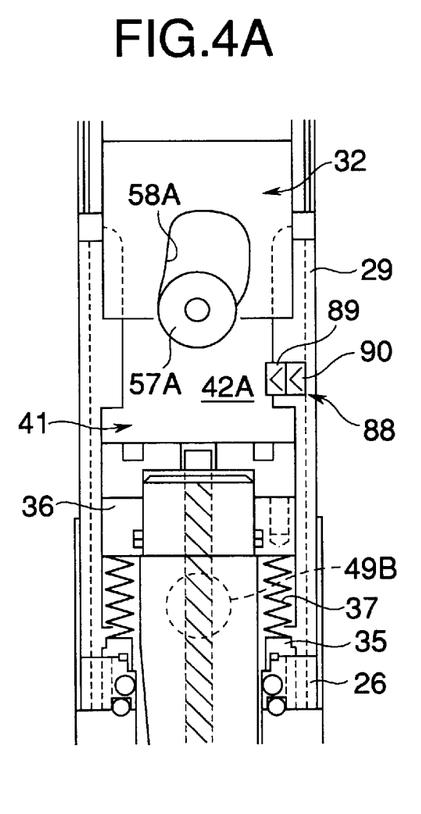
FIG. 4A is an enlarged view of an essential part (corresponding to the upper part of FIG. 3A) of the high-vacuum valve as provided with bayonet joints.
Figure 4B:
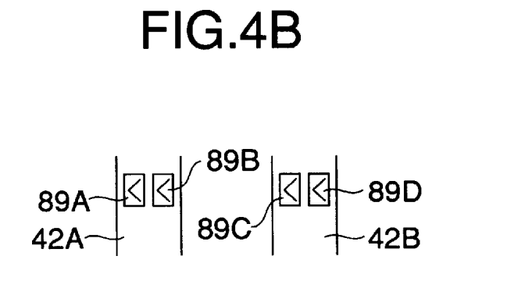
FIG. 4B is a layout drawing showing movable parts of the bayonet joints as viewed from the rear.

FIGS. 4A and 4B show an essential part of the embodiment of the present invention in a case where a bayonet joint 88 is provided for each of the wiring 78 of the heater 77 and the wiring 79 of the temperature sensor 81. It is known that when the high-vacuum valve according to the present invention is used in a transfer passage where a work such as an integrated circuit or parts thereof is transferred from a vacuum treating chamber to another vacuum treating chamber, the length of time that the valve 31 is closed is longer than the length of time that the valve 31 is open. Furthermore, it has become clear that if the heater 77 is supplied with electric power only when the valve 31 is closed, it is possible to prevent conduction of heat from the valve element 18 to a low-temperature part through the valve shaft 19. Therefore, the bayonet joint 88 is provided to allow electric power to be supplied through the bayonet joint 88 only when the valve 31 is closed. In other words, when the valve 31 is not closed, no electric power is supplied.

A movable part 89 of the bayonet joint 88 is secured to each of the rear surfaces of the connecting portions 42A and 42B of the cap body 41. A fixed part 90 of the bayonet joint 88 is secured to the front surface of a rear cover 29 at a position facing opposite to the movable part 89. As shown in FIG. 4B, movable parts 89A and 89B for electric power are secured to the rear surface of the connecting portion 42A. Movable parts 89C and 89D for sensor are secured to the rear surface of the connecting portion 42B. The fixed part 90 also includes a fixed part (not shown) for electric power and a fixed part (not shown) for sensor. When the valve 31 is not closed, the movable part 89 and the fixed part 90 are not in engagement with each other. When the valve 31 is closed by the pivotal motion of the valve shaft 19 and the cap body 41, the movable part 89 is engaged with (inserted into) the fixed part 90, causing the contact of the movable part 89 to come in contact with the contact of the fixed part 90. Thus, an electric current flows between the movable part 89 and the fixed part 90. Electric power passing through the movable parts 89A and 89B for electric power is supplied to the heater 77. The output of the temperature sensor 81 flows through the movable parts 89C and 89D for sensor. It should be noted that when a thermistor is used as the heater 77, the bayonet joint for sensor is not needed.

What is claimed is:

1. In a high-vacuum valve comprising:
   a valve body having a valve chamber therein, said valve body having a first opening formed in a front wall thereof and a second opening formed in a rear wall thereof;
   a valve seat formed on an inner side of one of said first opening and said second opening;
   a valve element connected to a proximal end of a valve shaft that performs rectilinear motion;
   said valve shaft extending from a proximal juncture with said valve element and through a center hole in a top wall of said valve body in a non-contact manner to a distal end; and
   a bellows covering a side surface of a portion of said valve shaft that is outside said valve chamber in a non-contact manner;
   wherein an area between a distal end of said bellows and a distal end portion of said valve shaft is hermetically sealed, and an area between a proximal end of said bellows and a portion of said top wall that surrounds said center hole is hermetically sealed; and
   wherein after said valve element has been moved to a position facing opposite to said valve seat by rectilinear motion of said valve shaft, said valve element is pressed against said valve seat to close a valve by pivotal motion of said valve shaft;
   the improvement which comprises:
      a heater provided in said valve shaft, said heater being in close contact with said valve shaft and being substantially coextensive with a portion of the valve shaft between the proximal juncture and the distal end; and
      wiring connected to said heater to supply it with electric power from outside said high-vacuum valve.

2. In a high-vacuum valve comprising:
   a valve body having a valve chamber therein;
   a plurality of ports communicated with said valve chamber through respective tubular portions;
   a bonnet connected to a top of said valve body;
   a valve seat formed in a flow path connecting said valve chamber and one of said tubular portions, wherein said flow path is closed by bringing a valve element into contact with said valve seat, and said flow path is opened by separating said valve element from said valve seat; and
   a valve shaft secured at a proximal juncture to said valve element, said valve shaft extending out of the valve chamber through a center hole in said bonnet to a distal end outside of the valve chamber;
   the improvement which comprises:
      a heater provided in said valve shaft, said heater being in close contact with said valve shaft and extending substantially coextensively with a portion of said shaft between the proximal juncture and the distal end; and
      wiring connected to said heater to supply it with electric power from outside said high-vacuum valve.

3. In a high-vacuum valve comprising:
   a valve body having a valve chamber therein, said valve body having a first opening formed in a front wall thereof and a second opening formed in a rear wall thereof;
   a valve seat formed on an inner side of one of said first opening and said second opening;
   a valve element connected to a proximal end of a valve shaft that performs rectilinear motion;
   said valve shaft extending through a center hole in a top wall of said valve body in a non-contact manner; and
   a bellows covering a side surface of a portion of said valve shaft that is outside said valve chamber in a non-contact manner;
   wherein an area between a distal end of said bellows and a distal end portion of said valve shaft is hermetically sealed, and an area between a proximal end of said bellows and a portion of said top wall that surrounds said center hole is hermetically sealed; and
   wherein after said valve element has been moved to a position facing opposite to said valve seat by rectilinear motion of said valve shaft, said valve element is pressed against said valve seat to close a valve by pivotal motion of said valve shaft;
   the improvement which comprises:
      a cap body connected to an upper portion of said valve shaft;
      a fulcrum roller connected to a lower portion of said cap body, said fulcrum roller being engaged with a fulcrum groove; and
      a guide roller connected to an upper portion of said cap body, said guide roller being engaged with a cam groove of a transmission member;
      wherein when said fulcrum roller lies at a proximal end of said fulcrum groove, said transmission member moves downward, causing said guide roller to move along said cam groove, thereby actuating said valve shaft to pivot in a direction in which said valve element is pressed against said valve seat; and
      wherein said transmission member is connected to an output shaft of an actuator, a spring is fitted between said transmission member and said cap body to urge said transmission member and said cap body axially away from each other, and said transmission member and said cap body are connected by a guide rod arranged to enable said transmission member and said cap body to move toward each other against the bias of the spring and to prevent said transmission member and said cap body from moving away from each other in excess of a set distance.

4. A high-vacuum valve according to claim 1, which comprises:
   a cap body connected to an upper portion of said valve shaft;
   a fulcrum roller connected to a lower portion of said cap body, said fulcrum roller being engaged with a fulcrum groove; and
   a guide roller connected to an upper portion of said cap body, said guide roller being engaged with a cam groove of a transmission member;

wherein when said fulcrum roller lies at a proximal end of said fulcrum groove, said transmission member moves downward, causing said guide roller to move along said cam groove, thereby actuating said valve shaft to pivot in a direction in which said valve element is pressed against said valve seat.

5. A high-vacuum valve according to claim 4, wherein said transmission member is connected to an output shaft of an actuator, and said transmission member and said cap body are connected by a guide rod so as not to come away from each other in excess of a set distance, and further a spring is fitted between said transmission member and said cap body to urge said transmission member and said cap body to come away from each other.

6. A high-vacuum valve according to claim 1, wherein at least one heater is provided in said valve body.

* * * * *